United States Patent [19]

Lovgren et al.

[11] 4,446,090

[45] May 1, 1984

[54] HIGH VISCOSITY SILICONE BLENDING PROCESS

[75] Inventors: Eric M. Lovgren, Westerlo; Joseph C. Golba, Jr., Ballston Spa; Randall A. Reed, Schenectady, all of N.Y.

[73] Assignee: General Electric Company, Schenectady, N.Y.

[21] Appl. No.: 538,636

[22] Filed: Oct. 3, 1983

[51] Int. Cl.³ .............................................. C08K 5/54
[52] U.S. Cl. .................... 264/211; 524/264; 524/265; 524/267
[58] Field of Search ....................... 524/264, 265, 267; 264/211

[56] References Cited

U.S. PATENT DOCUMENTS

| | | | |
|---|---|---|---|
| 2,884,388 | 4/1959 | Hedlund | 524/264 |
| 2,999,835 | 9/1961 | Goldberg | 524/267 |
| 3,087,908 | 4/1963 | Caird | 524/267 |
| 3,728,294 | 4/1973 | Levine | 524/267 |
| 3,737,479 | 6/1973 | Haaf | 524/265 |
| 3,795,646 | 3/1974 | MacKenzie et al. | 524/264 |
| 3,865,897 | 2/1975 | Falender et al. | 264/211 |
| 3,929,708 | 12/1975 | Brady et al. | 524/267 |
| 4,135,870 | 1/1979 | Wallace et al. | 264/211 |
| 4,164,603 | 8/1979 | Siggel et al. | 264/211 |
| 4,263,416 | 4/1981 | Liu et al. | 524/267 |
| 4,273,691 | 6/1981 | MacLaury et al. | 524/396 |
| 4,299,256 | 11/1981 | Bacchowski et al. | 264/211 |
| 4,387,176 | 6/1983 | Frye | 524/268 |

FOREIGN PATENT DOCUMENTS 50-78648  6/1975  Japan .

Primary Examiner—Veronica P. Hoke
Attorney, Agent, or Firm—Richard J. Traverso; James C. Davis, Jr.; James Magee, Jr.

[57] ABSTRACT

A method of continuously producing blends of thermoplastic polymers and high viscosity silicone fluids is provided by injecting the silicone fluid into an extruder where the thermoplastic polymers are molten. The dispersion of the silicone fluid can be controlled by adjusting the blending temperature and blends having superior engineering properties and flame retardance produced.

14 Claims, No Drawings

HIGH VISCOSITY SILICONE BLENDING PROCESS

CROSS REFERENCE TO RELATED APPLICATIONS

Reference is made to copending application of Joseph C. Golba, Jr., Ser. No. 528,383, filed Aug. 29, 1983, assigned to the same assignee as the present invention.

BACKGROUND OF THE INVENTION

This invention relates to a continuous process for producing blends of high viscosity silicone fluids and thermoplastic polymers. More particularly, this invention is related to a method of continuously blending one or more thermoplastic polymers and a high viscosity silicone fluid within an extruder.

Blending thermoplastic polymers with high viscosity silicone fluids often provides blends with desirable engineering properties and improved flame retardance, such as where the silicone fluid is a constituent of a flame retardant additive. Examples of such desirable blends are disclosed by MacLaury et al. in U.S. Pat. No. 4,273,691 and Frye in U.S. Pat. No. 4,387,176, assigned to the same assignee as the present invention.

Producing thermoplastic/silicone fluid blends has presented certain problems. The high viscosity silicone fluids typically comprise siloxane polymers having an average molecular weight of 50,000 or above and have a viscosity of 90,000 centipoise and above at 25° C. These fluids are difficult to handle and feed into conventional blending equipment with solid thermoplastic polymers due to their high viscosity.

Thermoplastic/silicone fluid blends have been produced with batch processes by MacLaury et al. and Frye. In these batch processes two roll mills and high intensity mixers are utilized.

Extruders are typically utilized in conventional continuous blending processes. However, the production of thermoplastic/silicone fluid blends by such processes has been difficult, if not impossible to achieve. The highly viscous silicone fluids and solid thermoplastic polymers cannot be fed into a conventional extruder without premixing the constituents into a uniform solids-gum feedstock. The difference in the consistencies of the silicone fluids and thermoplastic polymers does not permit them to be fed simultaneously into an extruder without premixing.

This premixing is usually accomplished by a batch process, wherein the high viscosity silicone fluid and a portion of the solid thermoplastic polymers are blended in a two roll mill or dough mixer. The remainder of the solid thermoplastic polymer is then mixed in with a high intensity mixer. This mixture is often screened by hand to break up agglomerated solids to provide a uniform solids-gum feedstock. This solids-gum feedstock is suitable for providing a uniform feed into an extruder since the two constitutents cannot separate within the feed hopper.

It is desirable to obtain a process where blends of high viscosity silicone fluids and solid thermoplastic polymers can be produced continuously without the costly pretreatment of the blend components. The present invention is based on the discovery that high viscosity silicone fluids can be fed into an extruder downstream of the feed hopper without substantially affecting the degree of dispersion of the blend produced. Furthermore, it has been discovered that this process provides blends having improved engineering properties and flame retardance over blends produced by conventional continuous processes and batch processes.

SUMMARY OF THE INVENTION

A method of continuously producing thermoplastic/silicone fluid blends is provided wherein a thermoplastic composition comprising one or more thermoplastic polymers is melted in an extruder, a high viscosity silicone fluid is injected into said extruder at a point where the thermoplastic composition is molten and the thermoplastic composition is blended with said high viscosity silicone fluid in the remaining portion of the extruder. In a particular embodiment of this invention, the blending temperature is controlled to maintain an optimum value so as to produce blends with a high degree of dispersion and minimal thermoplastic degradation. In addition, thermoplastic/silicone fluid blends are provided which have engineering properties and flame retardance superior to known blends.

OBJECTS OF THE INVENTION

An object of the present invention is to provide a simple and economical process for producing large quantities of thermoplastic/silicone fluid blends continuously.

Another object of the present invention is to produce thermoplastics/silicone fluid blends having a high degree of dispersion of blend constitutents and a minimal degradation of thermoplastics.

Another object of the present invention is to provide a process for producing thermoplastic/silicone fluid blends having consistent property profiles.

Another object of the present invention is to produce blends of polypropylene and high viscosity silicone fluids with improved engineering properties, material integrity, and flame retardance.

DESCRIPTION OF THE PREFERRED EMBODIMENTS

The objects of this invention and other objects are accomplished by (a) melting a solid thermoplastic composition comprising one or more thermoplastic polymers within an extruder; (b) injecting a high viscosity silicone fluid into the molten thermoplastic composition within the extruder; and (c) blending said molten thermoplastic composition with said high viscosity silicone fluid within the extruder.

The thermoplastic compositions suitable for use in this process are comprised of one or more thermoplastic polymers which are typically solid at ambient temperature. The melting of the thermoplastic composition is achieved within the extruder. Any conventional extruder is suitable for melting these thermoplastic compositions. Particular examples include twin screw co-rotating extruders, single screw extruders, twin screw counter-rotating extruders, etc. The process is not dependent upon any particular extruder size or screw geometry to achieve the desired objects; however, a particular extruder or extruder design may be preferred for certain thermoplastic polymers within the thermoplastic composition to provide suitable mixing and to avoid degradation during blending. Twin screw extruders are often preferred for the high shear rates and shear rate distribution obtained within them and the type of agitation it imparts to the melt.

The melting of the thermoplastic composition can be more particularly described as heating the thermoplastic composition within the extruder to a temperature sufficiently high to provide a viscosity that allows the thermoplastic polymers within to flow and be blended with other constituents. It is preferable to utilize the minimum temperature necessary to achieve these properties since excessive temperatures often cause unnecessary degradation of the thermoplastic polymers. This temperature will vary depending upon the thermoplastic polymers within said thermoplastic composition. Preferable temperatures for amorphous polymers typically fall within the range having a minimum value of about 70°-80° C. above the glasstransition temperature of the polymer and the maximum value of about the temperature of where degradation results. Preferable temperatures for crystalline polymers fall in the range having a minimum value of about 20°-30° C. above the crystalline melting point of said polymer and the maximum value of about the degradation temperature of said polymer.

The phrase "high viscosity silicone fluids" as used herein is intended to represent a wide range of polysiloxane materials having a high molecular weight. These high viscosity silicone fluids, often characterized as silicone gums, are comprised of about 20-100% siloxane polymers having an average molecular weight of about 50,000 or above and provide a viscosity of 90,000 centipoise and above at ambient temperature.

The silicone fluid is injected into the extruder at a point where the thermoplastic composition is molten, i.e. it has a viscosity sufficiently low so that the thermoplastic polymers flow. The optimum point of injection of the silicone fluids into the extruder is dependent on the materials started with, the equipment utilized, the thermoplastic/silicone fluid blends desired, etc. The high viscosity silicone fluids can be injected into the extruder utilizing conventional equipment. The preferred method of injecting the high viscosity silicone fluid is to utilize a metering pump that is supplied by a source of the high viscosity silicone fluid. The metering pump overcomes the pressure within the extruder when injecting the high viscosity silicone fluids and prevents the molten thermoplastic composition from exiting the extruder.

Where the thermoplastic/silicone fluid blend contains a mixture of thermoplastic polymers, preblending of the polymers within the extruder may be desired prior to the injection of silicone. This may be desired to prevent the high viscosity silicone fluid from interfering with the dispersion of the thermoplastic polymers. Where polymer preblending is desired, it is important that the point of injection of silicone fluid allows for a sufficient degree of agitation within the extruder to blend the molten thermoplastic composition and the high viscosity silicone fluid. The extent of agitation required is dependent on the quantity of high viscosity silicone fluid within the desired blend and the type of thermoplastic/silicone fluid blend desired. Introducing the high viscosity silicone at about $\frac{1}{3}$ the length of a twin screw extruder has been found to allow a sufficient degree of agitation when producing blends of polypropylene and high viscosity silicone fluids.

Once the thermoplastic compositions and high viscosity silicone fluids are blended within the extruder, the blends are passed through a die at the end of the extruder and pellitized. These pellets may subsequently be utilized in extrusion processes, injection molding processes, etc. to obtain finished products or they may be mixed with solid thermoplastic polymers and blended in an extruder to produce a diluted thermoplastic/silicone fluid blend.

The extent of dispersion of the high viscosity silicone fluid within the molten thermoplastic composition is dependent on factors such as, for example, the temperature at which blending takes place, the degree of agitation within the extruder, the differences in viscosity and the elasticity values of the silicone fluid and the molten thermoplastic composition, etc. Although dispersion of the silicone fluid within the molten thermoplastic composition is effected by the differences in their viscosity and elasticity during blending, the dispersion has been found to be more dependent upon the processing temperature at which these components are blended. Unlike the processes disclosed in copending application Ser. No. 528,383, filed Aug. 29, 1983, where blends of two or more molten thermoplastic polymers are produced, the blending temperature controls the dispersion process more strongly than the differences in viscosity and elasticity exhibited by the silicone fluid and the molten thermoplastic composition. Therefore, when attempting to control the dispersion of blend constituents in thermoplastic/silicone fluid blends, it is preferable to adjust the temperatures of the molten thermoplastic composition and silicone based fluid to provide a particular processing temperature during blending rather than attempt to balance their viscosity and elasticity values.

Methods of controlling the processing temperature at which the silicone fluid and thermoplastic composition are blended include controlling the temperatures of the components started with and controlling the extent to which the blend components are heated during blending. The preferred method for obtaining a particular processing temperature is a combination of the examples provided, wherein the temperature of the molten thermoplastic composition is adjusted prior to injection of the silicone fluid and the extent to which the blend components are heated during blending is controlled. By utilizing this procedure, the optimum processing temperature can be obtained soon after injection of the high viscosity silicone fluid and a large portion of the extruder which follows will operate at the optimum processing temperature.

Although heating the silicone fluid prior to injection is not required, it may be desirable to heat the high viscosity silicone fluid where the optimum blending temperature is very high. Although these high viscosity silicone fluids reach the optimum blending temperature soon after injection, heating the silicone fluid will allow the optimum blending temperature to be reached more quickly.

In the production of some thermoplastic/silicone fluid blends, such as polypropylene/silicone fluid blends, the degree of dispersion of blend constitutents increases as the processing temperature increases. The sensitivity of the thermoplastic polymers within the thermoplastic composition often places a limit on the magnitude of the blending temperature and the duration of exposure to this blending temperature. In such a situation the degree of dispersion obtained during blending is balanced with the degree of degradation of the thermoplastic polymers. The desired degree of dispersion within the blend can be obtained with a minimum amount of thermoplastic polymer degradation by adjusting either the temperature of the molten thermoplastic composition; the temperature of the high viscosity silicone fluid; the point of injection of the high viscosity silicone fluid; the extent of agitation via screw speed and screw design; or a combination of the above.

This process is suitable for the production of any thermoplastic/silicone fluid blend. The ratio of high viscosity silicone fluid to thermoplastic polymer within such blends can have a value within the range of about 0.005–200.0. Thermoplastic polymers which are suitable for this process include, for example, polycarbonates, such as LEXAN ® resin (manufactured by General Electric Co.); low density polyethylenes; high density polyethylenes; polypropylene; poly(alkylene terephthalates); polystyrenes; polyesters; polyimides; ionomers; polyurethanes; ter-polymers of acrylonitrile, butadiene and styrene; polyphenylene ethers; polyphenylene ether-polystyrene blends and copolymers, such as NORYL ® polymer (manufactured by General Electric Co.); polyamides etc. It is not intended that the above listing be all inclusive.

Examples of the high molecular weight siloxane polymers which may comprise the high viscosity silicone fluids include the organopolysiloxane polymers comprised of chemically combined siloxy units selected from the group consisting of:

$R_3SiO_{0.5}$
$RR'SiO$
$R_2SiO$
$R'_2SiO$
$R'SiO_{1.5}$
$RSiO_{1.5}$
$R'R_2SiO_{0.5}$
$SiO_2$ units and mixtures thereof, wherein each R represents a saturated or unsaturated monovalent hydrocarbon radical, R' represents a radical such as R or a radical selected from the group consisting of a hydrogen atom, hydroxy, alkoxy, aryl, alyl and vinyl radicals. A preferred organopolysiloxane material is polydimethylsiloxane having a viscosity of about 90,000–1,500,000 centipoise at 25° C. Other constituents which may be found in the high viscosity silicone fluids include the silicone resins disclosed by Frye in U.S. Pat. No. 4,387,176. These resins are typically characterized by the monomers they contain. For example, MQ resins are comprised of M units of the formula $R_2SiO_{0.5}$ and tetrafunctional Q units of the formula $SiO_2$. An example of a suitable MQ silicone resin is polytrimethylsilylsilicate which can have a ratio of M:Q units having a value within the range of 0.3–4.0. Silicone resins comprised of other functional units, such as a trifunctional unit $RSiO_{1.5}$, are also suitable.

Where a silicone resin is to be placed within a high viscosity silicone fluid, a criteria for suitability is that the silicone resin be soluble or dispersible within the mixture of high molecular weight siloxane polymers so that the high viscosity silicone fluid is a homogeneous mixture. It is preferable to premix the silicone resins with the high molecular weight siloxane polymers prior to injection into the extruder. This can be accomplished in a conventional extruder, such as a single screw extruder.

The high viscosity silicone fluids which are preferred in this process are those disclosed by Frye in U.S. Pat. No. 4,387,176 having a viscosity of 90,000 centipoise and above. These silicone fluids contain a mixture of 40–80% high molecular weight siloxane polymers, 2–40% silicone resin and 5–40% of a group IIA metal organic compound, wherein all percentages are by weight. An example of a high viscosity silicone fluid within the scope of disclosure by Frye is a mixture containing a silanol stopped polydimethylsiloxane, polytrimethylsilylsilicate resin and magnesium stearate.

In addition to the thermoplastic polymers and high viscosity silicone fluids within the blends desired, the thermoplastic/silicone fluid blend may also contain additives which enhance a particular property or aid processing. These additives may include, for example, reinforcing fillers, antioxidants, lubricants (processing aids), flame retardants, etc. It is preferable to utilize additives which are not sensitive to the blending temperatures utilized.

The additives are often aportioned between the molten thermoplastic composition and the high viscosity silicone fluid. Whether the particular additive is introduced into the thermoplastic composition or the high viscosity silicone fluid prior to blending is dependent on factors such as, for example, the temperature sensitivity of the additive, the quantity of the additive, the melt temperature of the additive, the function of the additive in the blend, etc. Where a particular additive is sensitive to high temperatures, it is often preferable to incorporate this additive into the high viscosity silicone fluids to minimize its exposure to high temperatures. Where an additive is difficult to disperse, it may be desirable to preblend the additive with the thermoplastic composition prior to injection of the silicone fluid. Preblending of additives within the thermoplastic composition often enhances their dispersion in the finished blend since the high viscosity silicone fluid is not present to inhibit such dispersion.

Suitable additives which are typically found in the finished blend include the Group IIA compounds or salts disclosed by Frye in U.S. Pat. No. 4,387,176 which enhance the flame retardance of the thermoplastics they are blended with. Examples of these compounds include magnesium stearate, calcium stearate, barium stearate, etc. Other flame retardants may also be incorporated into the blend, such as antimony oxide and decabromodiphenyloxide. Cross linking agents, such as dicumyl peroxide and reinforcing fillers, such as fumed silica, clay, talc, wallastonite, calcium carbonate, aluminum trihydrate, etc. are also suitable additives.

When producing blends of polypropylene and high viscosity silicone fluids, the polypropylene may be preblended with the desired additives of the blend prior to injection of the high viscosity silicone fluid. Suitable additives for such blends include, cross linking agents, reinforcing fillers, antioxidants, flame retardants processing aids, etc. The high viscosity silicone fluids may contain a temperature sensitive flame retardant additive, which is typically preblended with the silicone based resins prior to the injection into the extruder. Other additives which may be present in the silicone fluid include, antioxidants, cross linking agents and fillers.

The polypropylene based composition is typically melted at a temperature within the range of about 180°–280° C. and the high viscosity silicone fluid is typically maintained at ambient temperature and is injected into the extruder at this temperature. The temperature of the high viscosity silicone fluid increases rapidly within the extruder to the desired blending temperature shortly after contact with the molten polypropylene based composition.

Polypropylene/silicone fluid blends with high tensile strength, high tensile elongation and high flame retardance can be obtained when the blending temperature is maintained within the range of about 200°-300° C. The preferred blending temperature falls within the range of about 210°-240° C. To achieve these blending temperatures the molten polypropylene is maintained at about this temperature during preblending and the blend is heated slightly after injection of the high viscosity fluid. Under these conditions, at most only minor degradation results and the dispersion of blend constitutents is very high, as indicated by the high impact resistance and flame retardance of the blends produced.

The following examples are provided in order that those skilled in the art may be better able to understand this invention. They are provided to illustrate the invention and not intended to limit the scope of the invention.

EXAMPLES I-VI

These examples demonstrate embodiments of this invention wherein a series of blends are produced having consistent engineering properties and flame retardance. To produce the thermoplastic/silicone fluid blends, a solid powder feedstock comprised of polypropylene, talc, magnesium sterate soap and decabromodiphenyloxide was prepared in a Henschel high intensity mixer. This solid powder feedstock was metered at ambient temperature into the feedhopper of a Werner and Pfleiderer 28 mm twin screw extruder. The solid powder feedstock was melted and preblended within the twin screw extruder prior to injection of the silicone fluid. A high viscosity silicone fluid having a ratio of MQ resin to polydimethylsiloxane of 1:1.9 was injected into the twin screw extruder at about ⅓ the extruder length from the feedhopper. The silicone fluid was fed at ambient temperature utilizing a rotary gear pump that was supplied by a single screw extruder. The temperature of the molten polypropylene mixture was maintained in the range of about 220°-230° C. during blending and the screw speed in the twin screw extruder was maintained at about 200 revolutions per minute with a throughput rate of 6 lbs/hr. One sample was taken every hour over a six hour extrusion run to provide six samples. The samples comprised 19 weight percent high viscosity silicone fluid, 8.8 wt. percent magnesium stearate, 13.8 wt. percent decabromodiphenyloxide, 10.0 wt. percent talc, and 48.5 wt. percent polypropylene. The six samples were diluted with an equal weight of polypropylene in a twin screw extruder operating at 200 rpm and at a temperature within the range of about 220°-230° C. The throughput rate for the dilution of the polypropylene/silicone fluid blend was 6 lbs. per hour. The engineering properties and flame retardance of the six diluted samples are shown in Table I. The data illustrates: (a) the ability of the process to produce thermoplastic/silicone fluid blends with consistant property profiles and (b) the ability of this process to obtain a high degree of dispersion of blend constitutents.

TABLE I

Properties of Polypropylene/Silicone Fluid Blend

| Example | I | II | III | IV | V | VI | Batch Process |
|---|---|---|---|---|---|---|---|
| Production Time (Hours) | 1 | 2 | 3 | 4 | 5 | 6 | |
| Burn Times (sec) | 8 | 11 | 14 | 12 | 14 | 10 | 22 |
| Gardner Impact (in-lbs) | 52 | 60 | 60 | 56 | 52 | 60 | 160 |

TABLE I-continued

Properties of Polypropylene/Silicone Fluid Blend

| Example | I | II | III | IV | V | VI | Batch Process |
|---|---|---|---|---|---|---|---|
| Tensile Strength (psi) | 3,400 | 3,400 | 3,300 | 3,300 | 3,300 | 3,600 | 3,600 |
| Tensile Elongation (%) | 360 | 339 | 411 | 420 | 420 | 372 | 200 |

Burn times were obtained from a flamability test taken in accordance with Underwriters Laboratories, Inc. Bulletin U.L.-94 entitled, "Burning Test For Classifying Materials". The values represent the average flaming and/or glowing time after removal of an igniting flame from the sample.

As compared to the properties of the blend produced by a batch process, the blends produced in these examples show higher flame retardance and tensile elongation. The tensile strength is approximately equal to that of the control. Although Gardner Impact strength is reduced, the values are acceptable.

EXAMPLE 7

This example demonstrates an embodiment of the invention where a blend having properties comparable to a batch process are produced. The same proportion of blend constitutents as in Examples I-VI was blended in this example under the same process conditions. The blend contained 19 weight percent silicone fluid, 8.8 weight percent magnesium stearate, 13.8 weight percent decabromodiphenyl oxide, 10.0 weight percent talc and 48.5 weight polypropylene. The silicone fluid was comprised of a mixture of polydimethylsiloxane and MQ resin in a ratio of about 1.9:1. This sample was diluted by 50% with polypropylene in same twin screw extruder as that utilized in Examples I-VI. This twin screw extruder operated at a higher temperature of about 245° C. during the dilution, but the screw speed (200 RPM) and throughput rate (6 lbs per hour) were the same as in Examples I-VI. The engineering properties and flame retardance of the diluted polypropylene/silicone fluid blends produced are shown in Table II, where these properties are compared with a blend produced by a batch process. The data indicates that the blend produced in this example is of comparable quality to the blend produced by a batch process. This data also demonstrates the ability of this process to obtain a high degree of dispersion of blend constitutents.

TABLE II

| PROPERTIES OF POLYPROPYLENE/ SILICONE FLUID BLEND | | ALTERNATIVE DILUTION |
|---|---|---|
| | Example VII | Batch Process |
| Burn Times (sec) | 14 | 22 |
| Gardner Impact (in-lbs) | 145 | 160 |
| Tensile Strength (psi) | 3500 | 3600 |
| Tensile Elongation (%) | 280 | 220 |

Burn times represent the average flaming and/or glowing times after removal of an igniting flame from a specimen. The tests were carried out in accordance with the procedure outlined in Underwriters Laboratories, Inc. Bulletin UL-94.

EXAMPLE 8

This example demonstrates an embodiment of this invention which produced blends superior to a blend produced by a batch process and a conventional continuous process. The same proportion of blend constituents as in the diluted samples of Examples I–VII was blended under alternate processing conditions. The blend comprised 9.5 wt. percent silicone fluid, 4.4 wt. percent magnesium stearate, 6.9 wt. percent decabromodiphenyloxide and 5.0 wt. percent talc, 74.2 wt. percent polypropylene. The silicone fluid was comprised of a mixture of polydimethylsiloxane and MQ resin in a ratio of 1.9:1. The blend was produced in a Werner and Pfleiderer 30 mm twin screw extruder which operated at about 220°–230° C., a screw speed of 500 RPM and a throughput rate of 15 lbs/hr. No polypropylene dilution was necessary. The engineering properties and flame retardance of the blend are shown in Table III, where these blend properties are compared with those of blends produced by a batch process and by a conventional continuous process, defined as Blend IX.

TABLE III

Properties of Polypropylene/Silicone Fluid Blend (Alternative Blending Conditions)

| | Example VIII | Batch Process | Blend IX |
|---|---|---|---|
| Burn time (sec) | 11 | 22 | 16 |
| Gardner Impact (in-lbs.) | 211 | 160 | 181 |
| Tensile Strengths (psi) | 4012 | 3600 | 3381 |
| Tensile Elongation (%) | 299 | 220 | 183 |

Burn times were obtained from tests taken in accordance with Underwriters Laboratories, Inc. Bulletin U.L.-94.

Blend IX

Blend IX is a blend having a composition similar to that of Example VIII produced by a conventional continuous process wherein all ingredients were fed into a feedhopper after premixing. The blend comprised 9.5 wt. percent silicone fluid, 4.4 wt. percent magnesium stearate, 6.9 wt. percent decabromodiphenyloxide, 5.0 wt. percent talc and 74.2 wt. percent polypropylene. The silicone fluid comprised a mixture of polydimethylsiloxane and MQ resin in a ratio of 1.9:1. The same Werner and Pfleiderer 30 mm twin screw extruder was utilized as in Example VIII except the silicone fluid was not injected into the extruder. The extruder operated at a temperature of about 220°–230° C., screw speed of 500 RPM, and a throughput rate of 15/lbs/hr. The engineering properties and flame retardance of the polypropylene/silicone fluid blend is shown in Table III, where these properties are compared with those of the blends produced by a batch process and those produced by the embodiment of this invention described above.

This data indicates that the blends produced in accordance with this invention have superior flame retardance and engineering properties than blends produced by batch processes and by conventional continuous processes utilizing the same equipment.

Although the above examples have shown various modifications of the present invention, further modifications are possible in light of the above teachings by one skilled in the art without departing from the spirit and scope of the invention.

What is claimed is:

1. A method of continuously producing a thermoplastic/silicone fluid blend comprising
   (a) melting a solid thermoplastic composition comprising one or more thermoplastic polymers within an extruder;
   (b) injecting a high viscosity silicone fluid having a viscosity of at least 90,000 centipoise at ambient temperature into the molten thermoplastic composition within the extruder; and
   (c) blending said molten thermoplastic composition with said high viscosity silicone fluid within the extruder.

2. A method as in claim 1 comprising the additional step of controlling the temperature at which the molten thermoplastic composition is blended with the high viscosity silicone fluid.

3. A method as in claim 2 wherein the temperature at which said molten thermoplastic composition is blended with said high viscosity silicone fluid is controlled by adjusting the temperature of said molten thermoplastic composition prior to blending.

4. A method as in claim 1 wherein the high viscosity silicone fluid is injected into the extruder at a point between about ⅓ and ½ the extruder length downstream from the point where said thermoplastic composition is fed.

5. A method as in claim 1 wherein said thermoplastic composition is comprised essentially of one or more thermoplastic polymers selected from the group consisting of polycarbonates, low density polyethylenes, high density polyethylenes, polypropylene, polyphenylene ethers, poly(alkylene terephthalate)s, polystyrenes, polyesters, polyamides, polyimides, polyurethanes, ter-polymers of acrylonitriles, butadiene, and styrene.

6. A method as in claim 5 wherein said thermoplastic composition contains 50–97% thermoplastic polymers, 0–20% fillers selected from the group consisting of talc, clay, fumed silica, calcium carbonate, and wallastonite; 0–40% flame retardants selected from the group consisting of magnesium stearate, calcium stearate, barium stearate and decabromodiphenyloxide and 0–40% cross linking agents selected from the group consisting of dicumyl peroxide wherein all percentages are by weight.

7. A method as in claim 6 comprising the additional step of preblending the thermoplastic composition prior to injection of the high viscosity silicone fluid.

8. A method as in claim 1 wherein said high viscosity silicone fluid is comprised of about 20–100% polydimethylsiloxane.

9. A process as in claim 8 wherein said high viscosity silicone fluid contains about 2–50% MQ silicone resin wherein the ratio of M units to Q units provides a value within the range of about 0.3 to 4.0.

10. A method as in claim 2 wherein the thermoplastic composition is comprised substantially of polypropylene.

11. A method as in claim 10 wherein the temperature during blending is maintained at a value in the range of about 200°–275° C.

12. A method as in claim 11 wherein the blending temperature is maintained at a value in the range of about 210°–240° C.

13. A method as in claim 1 where the molten thermoplastic composition is comprised of about 80% polypropylene, about 7% talc, about 23% decabromodiphenyl oxide and about 10% magnesium stearate, wherein all percentages are by weight.

14. A thermoplastic silicone fluid blend produced in accordance with the process in claim 4, said blend comprising:
(a) 50–97 wt. percent of polypropylene;
(b) 1–40 wt. percent polydimethylsiloxane;
(c) 1–20 wt. percent magnesium stearate; and
(d) 1–20 wt. percent MQ resin.

* * * * *